(12) United States Patent
Adavi et al.

(10) Patent No.: US 11,144,481 B2
(45) Date of Patent: Oct. 12, 2021

(54) TECHNIQUES FOR DYNAMICALLY ADJUSTING THE MANNER IN WHICH I/O REQUESTS ARE TRANSMITTED BETWEEN A COMPUTING DEVICE AND A STORAGE DEVICE

(71) Applicant: Apple Inc., Cupertino, CA (US)

(72) Inventors: Bhaskar R. Adavi, Sunnyvale, CA (US); Manoj K. Radhakrishnan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/136,161

(22) Filed: Sep. 19, 2018

(65) Prior Publication Data

US 2019/0317906 A1 Oct. 17, 2019

Related U.S. Application Data

(60) Provisional application No. 62/656,326, filed on Apr. 11, 2018.

(51) Int. Cl.
| | |
|---|---|
| *G06F 13/24* | (2006.01) |
| *G06F 13/12* | (2006.01) |
| *G06F 13/16* | (2006.01) |
| *G06F 13/26* | (2006.01) |
| *G06F 13/22* | (2006.01) |
| *G06F 3/06* | (2006.01) |
| *G06F 9/54* | (2006.01) |

(52) U.S. Cl.
CPC .......... *G06F 13/1642* (2013.01); *G06F 3/067* (2013.01); *G06F 3/0634* (2013.01); *G06F 3/0659* (2013.01); *G06F 9/546* (2013.01); *G06F 13/225* (2013.01); *G06F 13/26* (2013.01); *G06F 2209/548* (2013.01)

(58) Field of Classification Search
CPC ............................... G06F 13/24; G06F 13/126
See application file for complete search history.

(56) References Cited

U.S. PATENT DOCUMENTS

| | | | |
|---|---|---|---|
| 8,433,833 B2 | 4/2013 | Yang et al. | |
| 9,417,821 B2 | 8/2016 | Slaight et al. | |
| 9,678,564 B2 * | 6/2017 | Fatemi | G06F 13/364 |
| 2002/0188784 A1 * | 12/2002 | Boles | G06F 13/24 |
| | | | 710/260 |

(Continued)

*Primary Examiner* — Hyun Nam
(74) *Attorney, Agent, or Firm* — Dickinson Wright RLLP

(57) ABSTRACT

Disclosed herein is a technique for managing I/O requests transmitted between a computing device and a storage device. According to some embodiments, the technique can be implemented by the computing device, and include providing at least one I/O request to a submission queue configured to store a plurality of I/O requests. In conjunction with providing the at least one I/O request, the computing device can identify that at least one condition associated with the submission queue—and/or a completion queue—is satisfied, where efficiency gains can be achieved. In turn, the computing device can (1) update an operating mode of the storage device to cause the storage device to cease interrupt issuances to the computing device when I/O requests are completed by the storage device, and (2) update an operating mode of the computing device to cause the computing device to periodically check the completion queue for completed I/O requests.

20 Claims, 6 Drawing Sheets

(56) References Cited

U.S. PATENT DOCUMENTS

| | | | |
|---|---|---|---|
| 2006/0224785 A1* | 10/2006 | Nakashima | G06F 13/126 710/48 |
| 2007/0168082 A1* | 7/2007 | Kim | B25J 9/1658 700/245 |
| 2010/0241771 A1* | 9/2010 | Nagai | G06F 13/24 710/52 |
| 2011/0029709 A1* | 2/2011 | Feiereisel | G06F 13/385 710/305 |
| 2012/0144172 A1* | 6/2012 | de Cesare | G06F 13/24 712/244 |
| 2014/0129751 A1* | 5/2014 | Cho | G06F 13/24 710/260 |
| 2014/0195708 A1* | 7/2014 | Klein | G06F 13/24 710/263 |
| 2014/0344492 A1* | 11/2014 | Patwa | G06F 13/24 710/269 |
| 2014/0359185 A1* | 12/2014 | Sawal | G06F 13/128 710/264 |
| 2015/0019765 A1* | 1/2015 | Kegel | G06F 13/24 710/48 |
| 2015/0049763 A1* | 2/2015 | Michels | H04L 12/6418 370/392 |
| 2015/0220278 A1* | 8/2015 | Sarcone | G06F 3/0688 711/103 |
| 2017/0010992 A1* | 1/2017 | Sarcone | G06F 13/26 |
| 2017/0017516 A1 | 1/2017 | Sato et al. | |
| 2018/0076833 A1* | 3/2018 | Akamine | G06F 13/24 |
| 2018/0107614 A1 | 4/2018 | Hong et al. | |
| 2019/0369882 A1* | 12/2019 | Radhakrishnan | G06F 11/3442 |

* cited by examiner

TECHNIQUES FOR DYNAMICALLY ADJUSTING THE MANNER IN WHICH I/O REQUESTS ARE TRANSMITTED BETWEEN A COMPUTING DEVICE AND A STORAGE DEVICE

CROSS-REFERENCE TO RELATED APPLICATIONS

The present application claims the benefit of U.S. Provisional Application No. 62/656,326, entitled "TECHNIQUES FOR DYNAMICALLY ADJUSTING THE MANNER IN WHICH I/O REQUESTS ARE TRANSMITTED BETWEEN A COMPUTING DEVICE AND A STORAGE DEVICE," filed Apr. 11, 2018, the content of which is incorporated herein by reference in its entirety for all purposes.

FIELD

The described embodiments set forth techniques for dynamically adjusting the manner in which input/output (I/O) requests are transmitted between a computing device and a storage device.

BACKGROUND

Generally, a storage device is configured to issue an interrupt to a computing device when the storage device completes the processing of an input/output (I/O) request issued by the computing device. In this regard, the computing device is able to identify when subsequent action should be taken on the completed I/O request. This can include, for example, providing data to a requesting entity when the I/O request is a read command that targets the data on the storage device. Alternatively, this can include indicating, to a requesting entity, that the I/O request was successfully processed when the I/O request is a write command.

The foregoing interrupt-based approach has traditionally provided a reliable infrastructure for managing the flow of information between computing devices and storage devices. For example, when an I/O request involves writing a large amount of data to a storage device, it is more efficient for the computing device to wait to process the I/O request completion until an interrupt is issued by the storage device (upon completion of the I/O request), as opposed to continually inquiring as to whether the storage device has completed the I/O request. However, scenarios exist where the nature of I/O requests being processed cause post-processing latencies that rival or even exceed the latencies associated with processing the I/O requests themselves, thereby degrading the overall performance of interrupt-based approaches.

Accordingly, what is needed is an improved technique that mitigates the above-described deficiencies of interrupt-based approaches.

SUMMARY

The described embodiments relate to techniques for dynamically adjusting the manner in which input/output (I/O) requests are transmitted between a computing device and a storage device. In particular, the techniques enable the computing device and the storage device to transition between (i) a polling-based I/O completion mode, and (ii) an interrupt-based I/O completion mode, based on the nature of the I/O requests that are being processed.

One embodiment sets forth a technique for dynamically adjusting the manner in which I/O requests are transmitted between a computing device and a storage device. According to some embodiments, the method can be implemented by the computing device, and include providing at least one I/O request to a submission queue configured to store a plurality of I/O requests. The method can also include identifying that at least one condition associated with the submission queue and/or a completion queue is satisfied while the plurality of I/O requests are being handled by the storage device, and, in response, activating (or maintaining) a polling-based I/O completion mode. According to some embodiments, the polling-based I/O completion mode can be activated by (1) updating an operating mode of the storage device to cause the storage device to cease interrupt issuances to the computing device when I/O requests are completed by the storage device, and (2) updating an operating mode of the computing device to cause the computing device to periodically check the completion queue for completed I/O requests.

Additionally, the method can further include identifying that the at least one condition is no longer satisfied, and, in response, activating an interrupt-based I/O completion mode. According to some embodiments, the interrupt-based I/O completion mode can be activated by (1) updating the operating mode of the storage device to cause the storage device to issue interrupts to the computing device when I/O requests are completed by the storage device, and (2) updating the operating mode of the computing device to cause the computing device to (i) cease polling for completions and (ii) check the completion queue for completed I/O requests in response to receiving the interrupts from the storage device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments set forth herein describe techniques for dynamically adjusting the manner in which input/output (I/O) requests are transmitted between a computing device and a storage device. In particular, the techniques enable the computing device and the storage device to transition between (i) a polling-based I/O completion mode and (ii) an interrupt-based I/O completion mode, based on the nature of the I/O requests that are being processed. A more detailed discussion of these techniques is set forth below and described in conjunction with FIGS. 1, 2A-2B, and 3A-3B, which illustrate detailed diagrams of systems and methods that can be used to implement these techniques.

Figure 1:
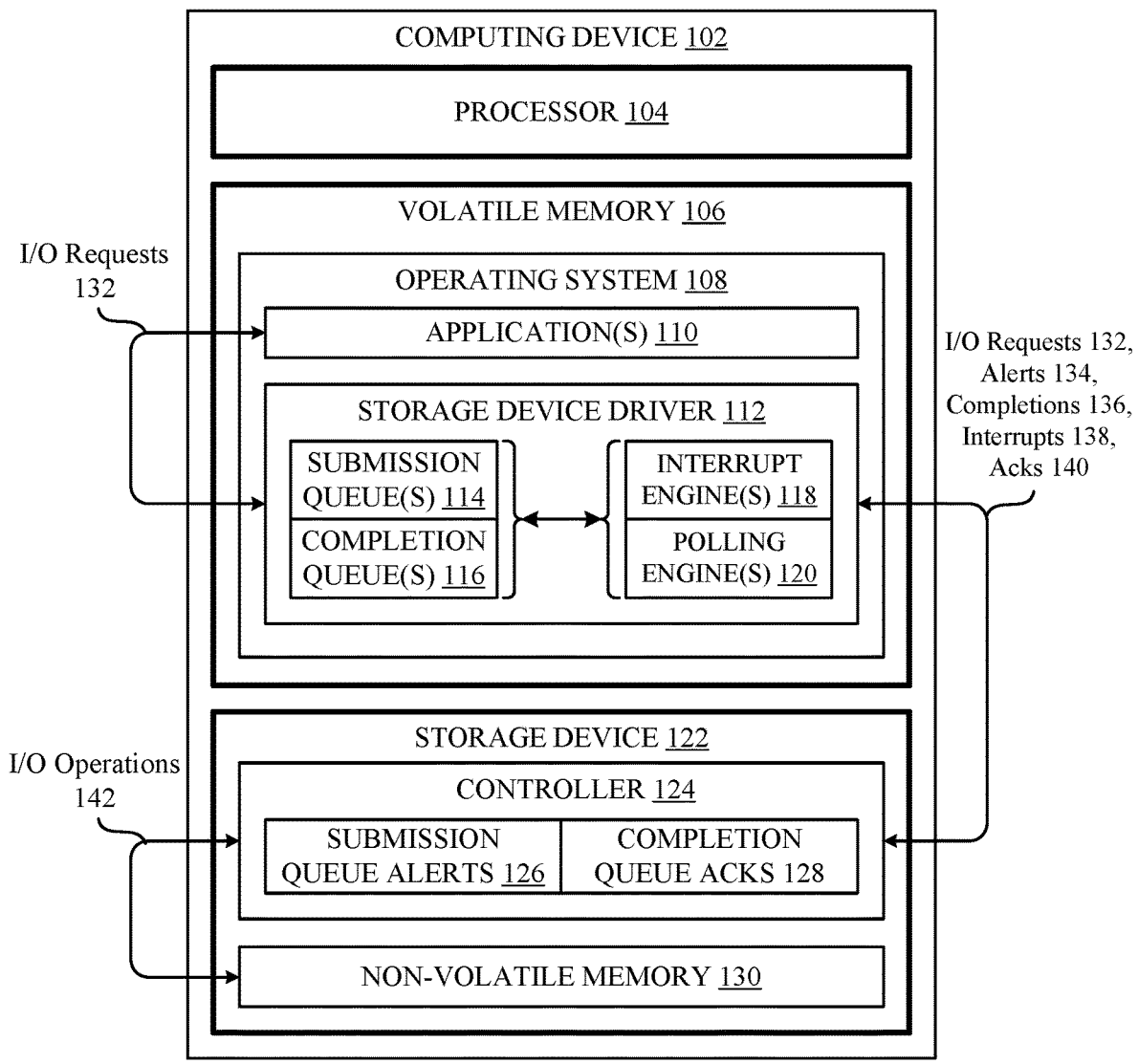
FIG. 1 illustrates a block diagram of different components of a system configured to implement the various techniques described herein, according to some embodiments.

FIG. 1 illustrates a block diagram 100 of a computing device 102—e.g., a smart phone, a tablet, a laptop, a desktop, a server, speaker, etc.—that can be configured to implement the various techniques described herein. It should be understood that the various hardware components of the computing device 102 illustrated in FIG. 1 are presented at a high level in the interest of simplification, and that an example of a more detailed breakdown is provided below in conjunction with FIG. 4. It should also be understood that the computing device 102 can include additional entities that enable the implementation of the various techniques described herein without departing from the scope of this disclosure. Is should additionally be understood that the entities described herein can be combined or split into additional entities without departing from the scope of this disclosure. It should further be understood that the various entities described herein can be implemented using software-based or hardware-based approaches (or a combination of software and hardware) without departing from the scope of this disclosure.

As shown in FIG. 1, the computing device 102 can include a processor 104 that, in conjunction with a volatile memory 106 (e.g., a dynamic random-access memory (DRAM)) and a storage device 122 (e.g., a hard drive, a solid-state drive (SSD), etc.), enables different software entities to execute on the computing device 102. For example, the processor 104 can be configured to load, into the volatile memory 106, various components for an operating system (OS) 108 that are stored in a non-volatile memory 130 of the storage device 122. In turn, the operating system 108 can enable the computing device 102 to provide a variety of useful functions, e.g., loading/executing various applications 110 (e.g., user applications). It is noted that it is not a requirement for the storage device 122 to be included within the computing device 102. On the contrary, the storage device 122 can be a separate/remote component that is accessed by the computing device 102.

As shown in FIG. 1, the operating system 108/applications 110 can issue I/O requests 132 to the storage device 122 via a storage device driver 112. The I/O requests 132 can represent, for example, new data writes, existing data overwrites, existing data migrations, and so on. According to some embodiments, the I/O request 132 can be associated with a collection of properties, for example, an operation directionality (i.e., read or write), a data size, a priority, and so on. It is noted that the foregoing properties are merely exemplary, and that all known properties of I/O requests 132 can be utilized by the techniques set forth herein without departing from the scope of this disclosure.

According to some embodiments, the priority of an I/O request 132 can automatically be assigned based on the nature of the application 110 that issues the I/O request 132. For example, I/O requests 132 issued by a "foreground" application 110—e.g., one that provides a graphical user interface (GUI) that is visible to a user—can automatically be assigned a high priority, as such I/O requests 132 are pertinent to an overall responsiveness of the computing device 102 that is expected by the user. Examples of foreground applications include utility applications, gaming applications, social media applications, and so on, that are actively being utilized by a user operating the computing device 102. In contrast, I/O requests 132 issued by a "background" application 110—e.g., one that is not visible to the user and/or is not being actively engaged by the user—can automatically be assigned a low priority, as such I/O requests 132 are not pertinent to the overall responsiveness of the computing device 102 that is expected by the user. Examples of background applications can include those that perform indexing operations in the background, generate previews for documents in the background, back up data to a cloud-based storage system, and so on. It is noted that the techniques set forth herein are not limited to such automatic assignment of priorities, and that each application 110 can manually assign different priorities to I/O requests 132 based on the respective urgencies of the I/O requests 132. Additionally, it is noted that any number of priorities can be implemented to achieve a desired level of granularity without departing from the scope of this disclosure. For example, different priority tiers (e.g., "tier 0", "tier 1", "tier 2", and "tier 3") can be assigned, where "tier 0" represents a highest priority level, while "tier 3" represents a lowest priority level.

Referring back now to FIG. 1, according to some embodiments, the storage device driver 112 can be configured to implement one or more submission queues 114 configured to store information about I/O requests 132 that have not been processed by the storage device 122 and require the attention of the storage device 122. It is noted that single queues are being discussed in the interest of simplifying this disclosure, and that any number of queues can be implemented without departing from the scope of this disclosure. According to some embodiments, the storage device driver 112 can also be configured to implement one or more completion queues 116 configured to store information about completed I/O requests 132 that have been processed by the storage device 122 and require the attention of the storage device driver 112. Additionally, the storage device driver 112 can be configured to implement one or more interrupt engines 118 that enable the interrupt-based I/O completion mode to operate, the details of which are described below in conjunction with FIGS. 2A and 3B. Additionally, the storage device driver 112 can be configured to implement one or more polling engines 120 that enable the polling-based I/O completion mode described herein to be implemented, the details of which are described below in conjunction with FIGS. 2B and 3A.

According to some embodiments, and as shown in FIG. 1, the storage device 122 can include a storage device controller 124 that is configured to orchestrate the overall operation of the storage device 122. In particular, the storage device controller 124 can implement submission queue alerts 126, which enables the storage device controller 124 to receive alerts 134 from the storage device driver 112 when I/O requests 132 are added to the submission queue 114. In turn, the storage device controller 124 can obtain the I/O requests 132 from the submission queue 114 and process the I/O requests 132 as I/O operations 142. Additionally, the storage device controller 124 can issue completions 136 to the completion queue 116 when the I/O operations 142 that correspond to the I/O requests 132 are completed. According to some embodiments, and as described in greater detail herein, an interrupt 138 can be issued in conjunction with the issuance of each completion 136 when the interrupt-based I/O completion mode is active. In turn, the interrupt engine 118 receives the interrupt 138 and checks the completion queue 116 for updates. Alternatively, the interrupts 138 are not issued by the storage device controller 124 when the polling-based I/O completion mode is active, as the polling engine 120 is configured to periodically check the completion queue 116 for updates. In either case, when the updates to the completion queue 116 are processed by the storage device driver 112, the storage device driver 112 can issue acknowledgements 140 to completion queue acknowledgements 128 (managed by the storage device controller 124) to indicate that the completion 136 was acknowledged/processed by the storage device driver 112.

Accordingly, FIG. 1 provides an overview of the manner in which the computing device 102 can be configured to implement the techniques described herein, according to some embodiments. An example of a more detailed breakdown of the manner in which the interrupt-based I/O completion mode and polling-based I/O completion mode operate—as well as the conditions that cause either mode to be activated—will now be provided below in conjunction with FIGS. 2A-2B and 3A-3B.

Figure 2A:
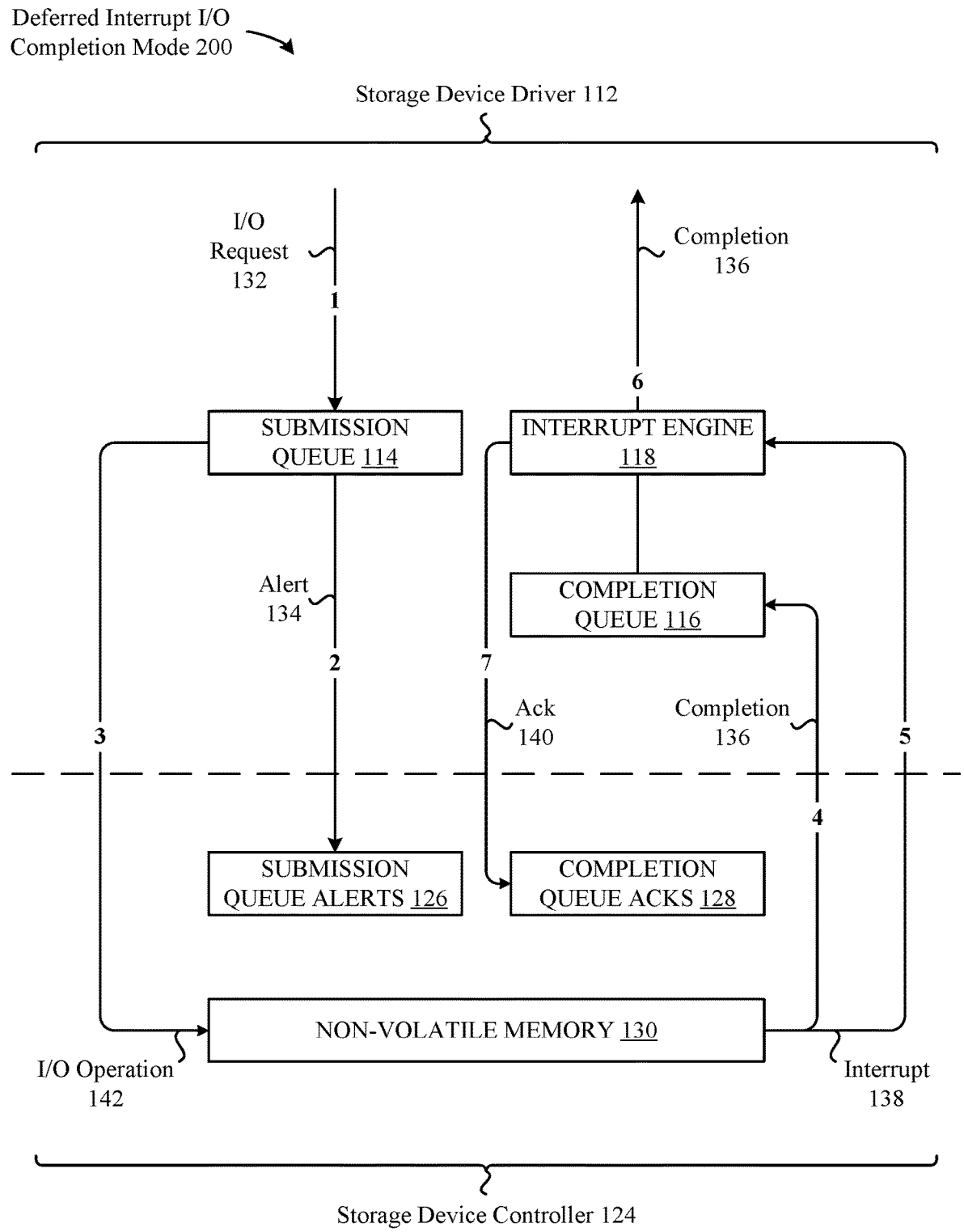
FIGS. 2A-2B illustrate conceptual diagrams of the manner in which information flows between a computing device and a storage device when an interrupt-based I/O completion mode or a polling-based I/O completion mode is activated, according to some embodiments.
Figure 2B:
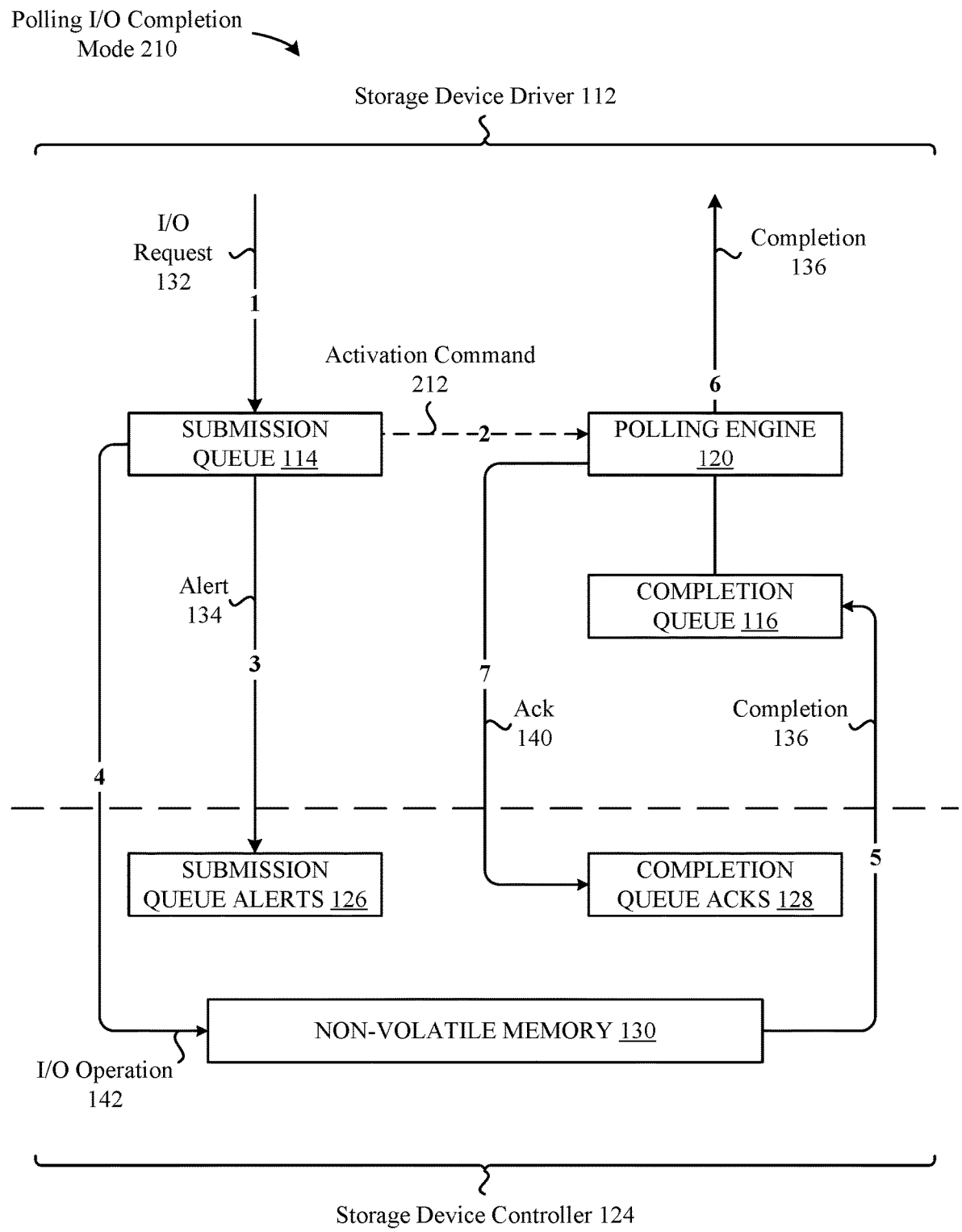

FIGS. 2A-2B illustrate conceptual diagrams of the manner in which information flows between the computing device 102 and the storage device 122 when an interrupt-based I/O completion mode or a polling-based I/O completion mode is activated, according to some embodiments. In particular, FIG. 2A illustrates an example breakdown 200 of a flow of information when the computing device 102 is operating in the interrupt-based I/O completion mode, and FIG. 2B illustrates an example breakdown 210 of a flow of information when the computing device 102 is operating in the polling-based I/O completion mode.

As shown in FIG. 2A, operating in the interrupt-based I/O completion mode can involve a step 201 where the storage device driver 112 receives an I/O request 132 from an entity executing on the computing device 102 (e.g., the operating system 108/an application 110). In turn, a step 202 involves the storage device driver 112 transmitting an alert 134 to the submission queue alerts 126 managed by the storage device controller 124. According to some embodiments, the alert 134 can include information about the I/O request 132/submission queue 114 so that the storage device controller 124 is able to identify that the I/O request 132 requires attention. In response to receiving the alert 134, the storage device controller 124 carries out a step 203 that involves performing an I/O operation 142 in accordance with the I/O request 132. This can involve, for example, reading data from the non-volatile memory 130 of the storage device 122, writing data into the non-volatile memory 130 of the storage device 122, and so on. When the I/O operation 142 is completed, the storage device controller 124 carries out a step 204 that involves transmitting a completion 136 to the completion queue 116. According to some embodiments, the completion 136 can include information associated with the I/O request 132, I/O operation 142, etc., so that the overall progress of the I/O request 132 within the computing device 102 can be understood by both the storage device driver 112 and the storage device controller 124.

Additionally, and as shown in FIG. 2A, the storage device controller 124 can be configured to carry out a step 205 that involves issuing an interrupt 138 to the interrupt engine 118 in conjunction with issuing the completion 136 at step 204. According to some embodiments, the interrupt 138 indicates to the interrupt engine 118 that the completion queue 116 has been updated—by way of the completion 136 issued at step 204—and requires the attention of the interrupt engine 118. In turn, the interrupt engine 118 can carry out a step 206 that involves issuing a completion 136 to the entity that issued the I/O request 132 at step 201 (e.g., the operating system 108/application 110). Additionally, the interrupt engine 118 can carry out a step 207 that involves issuing an acknowledgement 140 to the completion queue acknowledgements 128 managed by the storage device controller 124. In this manner, the storage device controller 124 is able to utilize the completion queue acknowledgements 128 to identify that the completion of the I/O request 132 has been recognized by the storage device driver 112.

Accordingly, FIG. 2A illustrates an example breakdown 200 of a flow of information between the storage device driver 112 and the storage device controller 124 when the computing device 102 is operating in the interrupt-based I/O completion mode. Notably, situations can arise where the required transmission of interrupts 138—e.g., step 205 in FIG. 2A—can establish relative processing latencies that degrade the overall performance of the computing device 102. For example, when the I/O request 132 illustrated in FIG. 2A represents a read command directed to a small amount of data, the various subsequent steps that need to be carried out—e.g., steps 204-207—establish impactful latencies that, in some cases, can even exceed the latency associated with executing the corresponding I/O operation 142 itself. Accordingly, the polling-based I/O completion mode illustrated in FIG. 2B can help mitigate this issue, which is described below in greater detail in conjunction with FIG. 2B.

As shown in FIG. 2B, the example breakdown 210 of the polling-based I/O completion mode includes a step 211 that involves the storage device driver 112 receiving an I/O request 132 from an entity executing on the computing device 102 (e.g., as described above in conjunction with step 201 of FIG. 2A). Notably, and in contrast to the interrupt-based I/O completion mode, the storage device driver 112 can respond to the I/O request 132 by issuing an activation command to the polling engine 120 at step 212. It is noted that the activation command can cause the polling engine 120 to activate when the polling engine 120 is in an inactive state, or cause the polling engine 120 to remain active when the polling engine 120 is already in an active state. Other approaches can be used to carry out the intended effect of step 212 illustrated in FIG. 2B without departing from the scope of this disclosure. For example, the storage device driver 112 can reference a binary flag that indicates the I/O completion mode that is currently active (i.e., the interrupt-based I/O completion mode or the polling-based I/O completion mode). In this manner, the storage device driver 112 can forego issuing activation commands each time an I/O request 132 is received when the polling-based I/O completion mode is currently active, thereby improving overall operating efficiency.

According to some embodiments, and as described herein, the polling engine 120 can be configured to periodically reference the completion queue 116 to identify any new entries i.e., completions 136—that are added to the completion queue 116 by the storage device controller 124 when I/O operations 142 are successfully processed. In this regard, the storage device controller 124 may not issue interrupts 138, which are relied upon by the interrupt-based I/O completion mode. In this manner, operational efficiency gains can be achieved—especially when the appropriate conditions are met for activating the polling-based I/O completion mode over the interrupt-based I/O completion mode, which are described below in greater detail in conjunction with FIGS. 3A-3B.

As shown in FIG. 2B, a step 213 involves the storage device driver 112 transmitting an alert 134 to the submission queue alerts 126 managed by the storage device controller 124 (e.g., as described above in conjunction with step 202 of FIG. 2A). In response to receiving the alert 134, the storage device controller 124 carries out a step 214 that involves performing an I/O operation 142 in accordance with the I/O request 132 (e.g., as described above in conjunction with step 203 of FIG. 2A). When the I/O operation 142 is completed, the storage device controller 124 carries out a step 215 that involves transmitting a completion 136 to the completion queue 116 (e.g., as described above in conjunction with step 204 of FIG. 2A). Again, and in contrast to the interrupt-based I/O completion mode, the polling-based I/O completion mode does not involve issuing an interrupt 138 in conjunction with issuing the completion 136. In particular, and as previously described herein, the polling engine 120 is configured to periodically check the completion queue 116 for updates, thereby obviating the need for interrupts 138 to be issued by the storage device controller 124.

The polling engine 120 can identify the completion 136 issued at step 215. FIG. 2B, and, in response, carry out a step 216 that involves providing the completion 136 to the entity that issued the I/O request 132 at step 211 (e.g., as described above in conjunction with step 206 of FIG. 2A). Additionally, the polling engine 118 can carry out a step 217 that involves issuing an acknowledgement 140 to the completion queue acknowledgements 128 managed by the storage device controller 124 (e.g., as described above in conjunction with step 207 of FIG. 2A).

Accordingly, FIG. 2B illustrates an example breakdown 210 of a flow of information between the storage device driver 112 and the storage device controller 124 when the computing device 102 is operating in the polling-based I/O completion mode. As previously noted herein, different factors can be taken into consideration when the storage device driver 112 is attempting to identify whether operating in the interrupt-based I/O completion mode or operating in the polling-based I/O completion mode is more optimal. Accordingly, FIGS. 3A-3B are provided to illustrate a method 300 for dynamically transitioning between the interrupt-based I/O completion mode and the polling-based I/O completion mode, according to some embodiments.

Figure 3A:
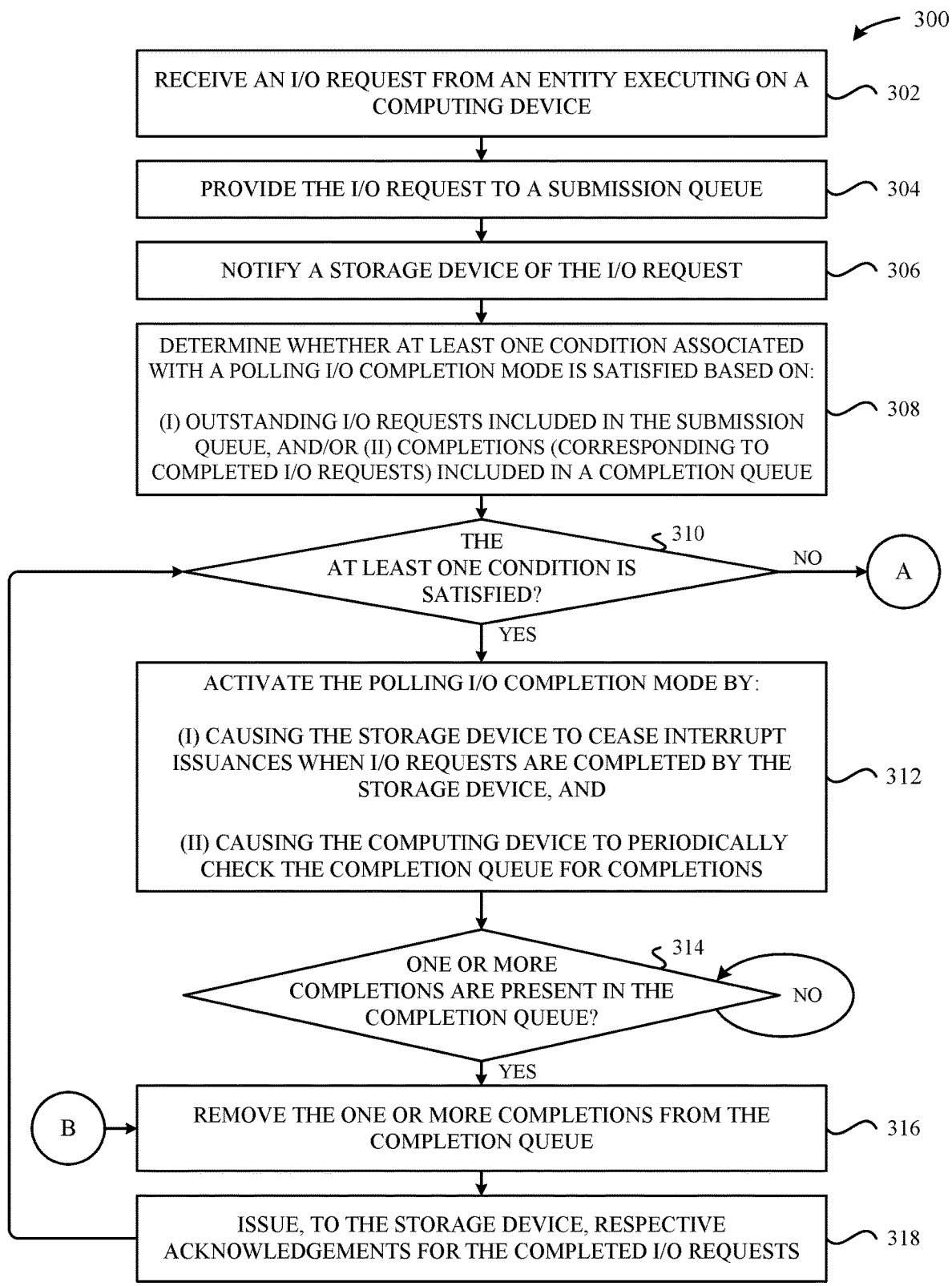
FIGS. 3A-3B illustrate method for dynamically transitioning between the interrupt-based I/O completion mode and the polling-based I/O completion mode, according to some embodiments.
Figure 3B:
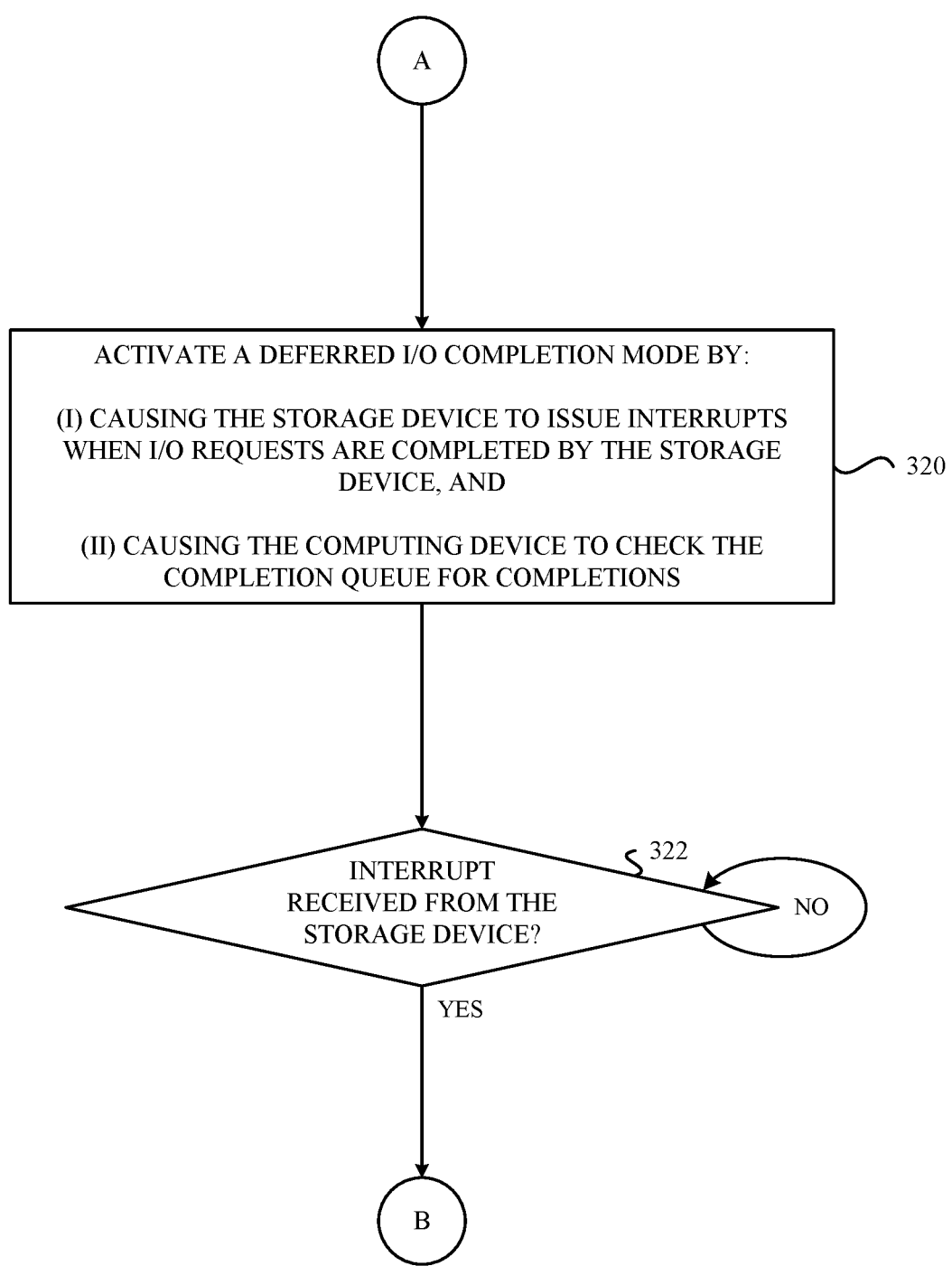

As shown in FIG. 3A, the method 300 begins at step 302, where the storage device driver 112 receives an I/O request 132 from an entity (e.g., the operating system 108, an application 110, etc.) executing on the computing device 102. According to some embodiments, the I/O request 132 can include a collection of properties that describe the nature of the I/O request 132 (as described above in conjunction with FIG. 1). At step 304, the storage device driver 112 provides the I/O request 132 to a submission queue 114 managed by the storage device driver 112. At step 306, the storage device driver 112 notifies the storage device 122—in particular, the storage device controller 124 of the storage device 122—of the I/O request 132. According to some embodiments, the storage device driver 112 can be configured to transmit an alert 134 to the submission queue alerts 126 (managed by the storage device controller 124) each time an I/O request 132 is placed into the submission queue 114. In this manner, the storage device controller 124 can be aware of when to take action on new I/O requests 132 that need to be processed.

At step 308, the storage device driver 112 determines whether at least one condition associated with the polling-based I/O completion mode is satisfied based on (i) outstanding I/O requests 132 included in the submission queue 114, and/or (ii) completions 136 (that correspond to completed I/O requests 132) included in the completion queue 116. In particular, step 308 involves the storage device driver 112 identifying whether it is appropriate to activate (or maintain) the polling-based I/O completion mode based on the outstanding/completed I/O requests 132 within the computing device 102. As previously described herein, the storage device driver 112 can take any number of factors into consideration when making this determination. For example, the at least one condition can be satisfied when at least one of the I/O requests 132 indicates (i) a read operation directionality, (ii) a priority of a highest level, and/or (iii) a data size that satisfies a threshold size. Moreover, the at least one condition can be satisfied when a number of the I/O requests 132 satisfies a threshold number. Again, it is noted that the above-described factors are exemplary, and that any number of factors can be analyzed and combined when attempting to identify the operating mode that is most efficient for processing the current I/O requests 132.

At step 310, the storage device driver 112 determines whether the at least one condition is satisfied. If, at step 310, the storage device driver 112 determines that the at least one condition is satisfied, then the method 300 proceeds to step 312. Otherwise, the method 300 proceeds to step 320 of FIG. 3B, which is described below in greater detail. At step 312, the storage device driver 112 activates (or maintains) the polling-based I/O completion mode by causing the storage device 122 to cease the issuance of interrupts 138 when I/O requests 132 are completed by the storage device 122.

According to some embodiments, the storage device driver 112 can transmit, to the storage device controller 124, a command that indicates to the storage device controller 124 the mode that is currently active—i.e., the polling-based I/O completion mode or the interrupt-based I/O completion mode. For example, when transitioning from the interrupt-based I/O completion mode to the polling-based I/O completion mode, the command can indicate to the storage device controller 124 that interrupts 138 should no longer be issued to the storage device driver 112 each time an I/O request 132 is completed by the storage device controller 124. Conversely, when transitioning from the polling-based I/O completion mode to the interrupt-based I/O completion mode, the command can indicate to the storage device controller 124 that interrupts 138 should be issued to the storage device driver 112 each time an I/O request 132 is completed by the storage device controller 124. According to some embodiments, the command can cause a different value to be assigned to a binary flag that is accessible to the storage device controller 124, e.g., where a value of "1" indicates that the interrupt-based I/O completion mode is active, and a value of "0" indicates that the polling-based I/O completion mode is active. It is noted that any known technique can be utilized between the storage device driver 112/storage device controller 124 to effectively maintain and identify the active mode without departing from the scope of this disclosure.

Additionally, it is noted that the storage device driver 112/storage device controller 124 can be configured to perform the foregoing mode transitions in an organized manner to avoid unpredictable behavior from occurring within the computing device 102. For example, when transitioning from the interrupt-based I/O completion mode to the polling-based I/O completion mode, the polling engine 120 can be configured to wait for the interrupt engine 118 conclude the processing of any outstanding completions 136 that were inserted into the completion queue 116 in conjunction with interrupts 138. Conversely, when transitioning from the polling-based I/O completion mode to the interrupt-based I/O completion mode, the polling engine 120 can be configured to conclude the processing of any outstanding completions 136 that were inserted into the completion queue 116 independent from any interrupts 138 (as interrupts 138 are not issued when operating in the polling-based I/O completion mode). In turn, the polling engine 120 can issue the above-described command to activate the interrupt-based I/O completion mode, which subsequently causes the storage device controller 124 to resume issuing interrupts 138 in conjunction with completions 136 that are issued as I/O requests 132 are completed.

Additionally, and as shown in FIG. 3A, activating the polling-based I/O completion mode can also involve causing the computing device 102 to periodically check the completion queue 116 for completions 136 that correspond to the completed I/O requests 132. According to some embodiments, this can involve the storage device driver 112 activating a polling engine 120 configured to check the completion queue 116 for the completions 136. For example, the polling engine 120 can be configured to check the completion queue 116 at timed intervals with the expectation that at least one completion 136 will imminently be placed into the completion queue 116, given that the at least one condition was satisfied and caused the polling-based I/O completion mode to be activated. In this regard, the polling engine 120 does not rely on the interrupts 138 being issued by the storage device controller 124 when I/O requests 132 are completed (as with the interrupt-based I/O completion mode).

Accordingly, at step 314, the storage device driver 112—in particular, the polling engine 120 associated with the storage device driver 112—determines whether a completion 136 that corresponds to the I/O request 132 received at step 302—or other completions 136 that correspond to I/O requests 132 received at other times—are present in the completion queue 116. If, at step 314, the storage device driver 112 determines that at least one completion 136 is present in the completion queue 116, then the method 300 proceeds to step 316. Otherwise, the method 300 can repeat at step 314, where the polling engine 120 continues to periodically check the completion queue 116 for completions 136 as long as the polling-based I/O completion mode is active.

At step 316, the polling engine 120 removes the one or more completions 136 from the completion queue 116. It is noted that the polling engine 120 can perform the removal itself, or can report up to and request that the storage device driver 112 perform the removal. At step 318, the polling engine 120—or the storage device driver 112, as previously described—issues, to the storage device controller 124, respective acknowledgements 140 for the one or more completions 136. According to some embodiments, the storage device controller 124 can place the acknowledgements 140 into the completion queue acknowledgements 128 managed by the storage device controller 124. In this manner, the storage device controller 124 can effectively utilize the completion queue acknowledgements 128 to identify that the I/O requests 132 are being received and acknowledged by the storage device driver 112 at a rate that will not result in an overflow.

Accordingly, steps 312-318 describe the manner in which the storage device driver 112 and the storage device controller 124 operate when the polling-based I/O completion mode is active. However, as described herein, an interrupt-based I/O completion mode can instead be activated when the at least one condition at step 310 is no longer satisfied. This can dynamically occur, for example, when pending I/O requests 132 that caused the polling-based I/O completion mode to be activated are completed, when new I/O requests 132 are received and do not meet the requirements of the polling-based I/O completion mode, and so on. At step 310, when the at least one condition is not satisfied, the method 300 proceeds to step 320 of FIG. 3B, where the storage device driver 112 activates the interrupt-based I/O completion mode by (i) causing the storage device controller 124 to issue interrupts 138 when I/O requests 132 are completed by the storage device 122. As previously described herein, the storage device controller 124 can update the binary flag to indicate that an interrupt 138 should be issued any time an I/O request 132 is successfully processed.

Additionally, and as shown in step 320 of FIG. 3B, activating the interrupt-based I/O completion mode can also involve (ii) causing the storage device driver 112 to check the completion queue 116 for completions 136 in response to receiving the interrupts 138 from the storage device 122. According to some embodiments, the storage device driver 112 can activate an interrupt engine 118 that is specifically configured to check the completion queue 116 for completions 136 in response to interrupts 138 that are issued by the storage device controller 124. For example, the storage device driver 112 can receive an interrupt 138 from the storage device controller 124 and notify the interrupt engine 118 of the interrupt 138. In turn, the interrupt engine 118 can check the completion queue 116 for a completion 136 that will presumably be present, given that the storage device controller 124 issued the interrupt 138 after placing the completion 136 (associated with the interrupt 138) into the completion queue 116. In this regard, interrupt engine 118 relies on the interrupts 138 being issued by the storage device controller 124 when I/O requests 132 are completed, which is distinct from the polling-based I/O completion mode.

At step 322, the storage device driver 112 (or the interrupt engine 118) waits for interrupts 138 to be received from the storage device 122. If, at step 322, the storage device driver 112 determines that an interrupt is received from the storage device 122, then the method 300 proceeds back to step 316 of FIG. 3A, where steps 316 and 318 are carried out as previously described herein. Otherwise, the method 300 remains at step 322, and the storage device driver 112 (or the interrupt engine 118) waits for interrupts 138 to be received from the storage device 122.

Figure 4:
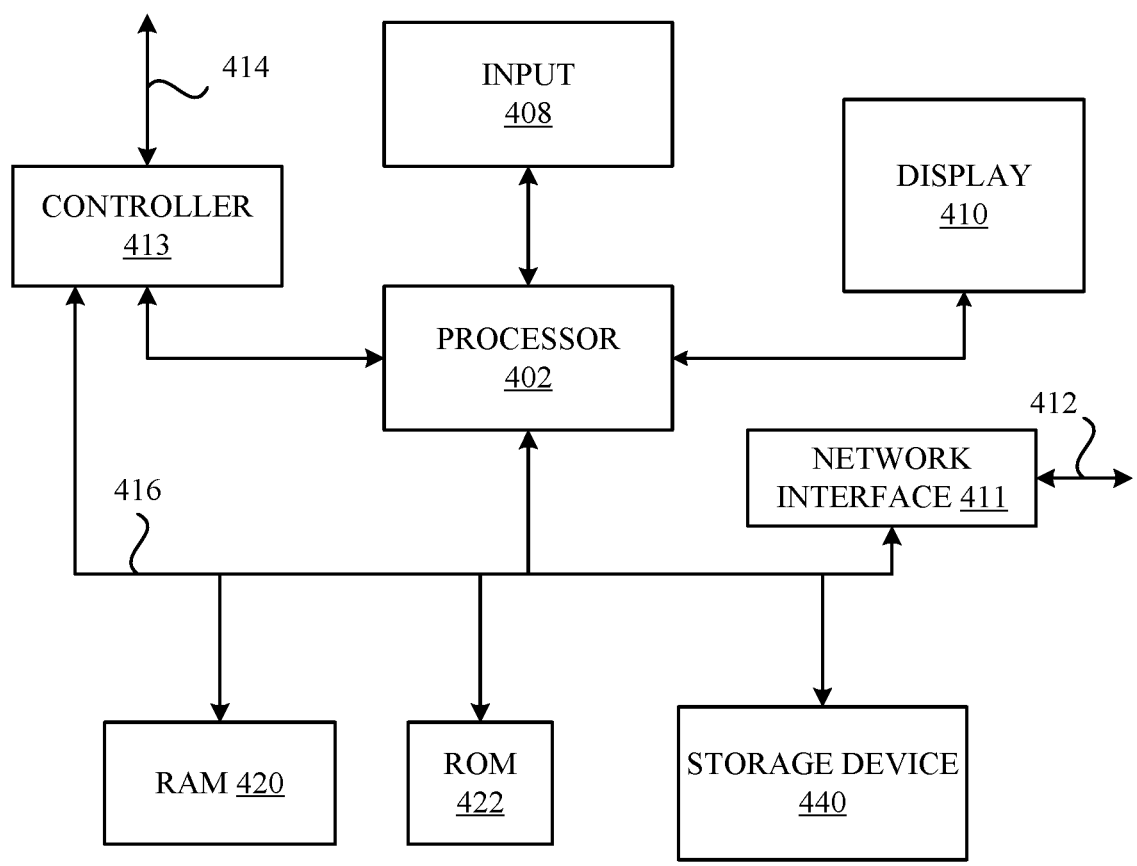
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the computing device 102 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also includes a storage device 440, which can comprise a single disk or a plurality of disks (e.g., SSDs), and includes a storage management module that manages one or more partitions within the storage device 440. In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically adjusting a manner in which I/O requests are transmitted between a computing device and a storage device, the method comprising, by at least one processor included in the computing device:
   providing at least one I/O request to a submission queue configured to store a plurality of I/O requests;
   when at least one condition associated with the submission queue and/or a completion queue is satisfied while the plurality of I/O requests are being handled by the storage device:
      (i) updating a first operating mode of the storage device to prevent the storage device from sending interrupts to the at least one processor when I/O requests are completed by the storage device,
      (ii) processing completed I/O requests inserted into the completion queue in conjunction with respective interrupts issued by the storage device, and
      (iii) updating a second operating mode of the computing device to cause the at least one processor to periodically poll the completion queue for completed I/O requests; and
   when the at least one condition is no longer satisfied:
      updating the first operating mode of the storage device to cause the storage device to issue interrupts to the at least one processor when I/O requests are completed by the storage device, and
      updating the second operating mode of the computing device to cause the at least one processor to check the completion queue for completed I/O requests in response to receiving the interrupts from the storage device.

2. The method of claim 1, further comprising, prior to providing the plurality of I/O requests:
   receiving the plurality of I/O requests, wherein each I/O request of the plurality of I/O requests indicates:
      an operation directionality associated with the I/O request,
      a priority associated with the I/O request, and
      a data size associated with the I/O request.

3. The method of claim 2, wherein the at least one condition is satisfied when:
   at least one I/O request of the plurality of I/O requests indicates (i) a read operation directionality, (ii) a priority of a highest level, and/or (iii) a data size that satisfies a threshold size; and/or
   a number of the I/O requests satisfies a threshold number.

4. The method of claim 1, wherein, for each I/O request of the plurality of I/O requests, the storage device handles the I/O request by:
   removing the I/O request from the submission queue,
   processing the I/O request, and
   inserting the I/O request into the completion queue as a completed I/O request.

5. The method of claim 4, further comprising, for each completed I/O request:
   informing a calling entity associated with the completed I/O request; and
   transmitting, to the storage device, an acknowledgement associated with the completed I/O request.

6. The method of claim 1, wherein the submission queue stores I/O requests that have yet to be processed by the storage device.

7. The method of claim 1, wherein:
the submission queue is a member of a plurality of submission queues,
the completion queue is a member of a plurality of completion queues, and
when the at least one condition is satisfied, the at least one processor implements, for each completion queue of the plurality of completion queues, a respective thread that periodically polls the completion queue for completed I/O requests.

8. At least one non-transitory computer readable storage medium configured to store instructions that, when executed by at least one processor included in a computing device, cause the computing device to dynamically adjust a manner in which I/O requests are transmitted between the computing device and a storage device, by carrying out steps that include:
providing at least one I/O request to a submission queue configured to store a plurality of I/O requests;
when at least one condition associated with the submission queue and/or a completion queue is satisfied while the plurality of I/O requests are being handled by the storage device:
(i) updating a first operating mode of the storage device to prevent the storage device from sending interrupts to the at least one processor when I/O requests are completed by the storage device,
(ii) processing completed I/O requests inserted into the completion queue in conjunction with respective interrupts issued by the storage device, and
(iii) updating a second operating mode of the computing device to cause the at least one processor to periodically poll the completion queue for completed I/O requests; and
when the at least one condition is no longer satisfied:
updating the first operating mode of the storage device to cause the storage device to issue interrupts to the at least one processor when I/O requests are completed by the storage device, and
updating the second operating mode of the computing device to cause the at least one processor to check the completion queue for completed I/O requests in response to receiving the interrupts from the storage device.

9. The at least one non-transitory computer readable storage medium of claim 8, wherein the steps further include, prior to providing the plurality of I/O requests:
receiving the plurality of I/O requests, wherein each I/O request of the plurality of I/O requests indicates:
an operation directionality associated with the I/O request,
a priority associated with the I/O request, and
a data size associated with the I/O request.

10. The at least one non-transitory computer readable storage medium of claim 9, wherein the at least one condition is satisfied when:
at least one I/O request of the plurality of I/O requests indicates (i) a read operation directionality, (ii) a priority of a highest level, and/or (iii) a data size that satisfies a threshold size; and/or
a number of the I/O requests satisfies a threshold number.

11. The at least one non-transitory computer readable storage medium of claim 8, wherein, for each I/O request of the plurality of I/O requests, the storage device handles the I/O request by:
removing the I/O request from the submission queue,
processing the I/O request, and
inserting the I/O request into the completion queue as a completed I/O request.

12. The at least one non-transitory computer readable storage medium of claim 11, wherein the steps further include, for each completed I/O request:
informing a calling entity associated with the completed I/O request; and
transmitting, to the storage device, an acknowledgement associated with the completed I/O request.

13. The at least one non-transitory computer readable storage medium of claim 8, wherein the submission queue stores I/O requests that have yet to be processed by the storage device.

14. The at least one non-transitory computer readable storage medium of claim 8, wherein:
the submission queue is a member of a plurality of submission queues,
the completion queue is a member of a plurality of completion queues, and
when the at least one condition is satisfied, the at least one processor implements, for each completion queue of the plurality of completion queues, a respective thread that periodically polls the completion queue for completed I/O requests.

15. A computing device configured to dynamically adjusting a manner in which I/O requests are transmitted between the computing device and a storage device, the computing device comprising:
at least one processor; and
at least one memory storing instructions that, when executed by the at least one processor, cause the computing device to:
provide at least one I/O request to a submission queue configured to store a plurality of I/O requests;
when at least one condition associated with the submission queue and/or a completion queue is satisfied while the plurality of I/O requests are being handled by the storage device:
(i) update a first operating mode of the storage device to prevent the storage device from sending interrupts to the at least one processor when I/O requests are completed by the storage device,
(ii) process completed I/O requests inserted into the completion queue in conjunction with respective interrupts issued by the storage device, and
(iii) update a second operating mode of the computing device to cause the at least one processor to periodically poll the completion queue for completed I/O requests; and
when the at least one condition is no longer satisfied:
update the first operating mode of the storage device to cause the storage device to issue interrupts to the at least one processor when I/O requests are completed by the storage device, and
update the second operating mode of the computing device to cause the at least one processor to check the completion queue for completed I/O requests in response to receiving the interrupts from the storage device.

16. The computing device of claim 15, wherein the at least one processor further causes the computing device to, prior to providing the plurality of I/O requests:
receive the plurality of I/O requests, wherein each I/O request of the plurality of I/O requests indicates:
an operation directionality associated with the I/O request,
a priority associated with the I/O request, and
a data size associated with the I/O request.

17. The computing device of claim 16, wherein the at least one condition is satisfied when:
- at least one I/O request of the plurality of I/O requests indicates (i) a read operation directionality, (ii) a priority of a highest level, and/or (iii) a data size that satisfies a threshold size; and/or
- a number of the I/O requests satisfies a threshold number.

18. The computing device of claim 15, wherein, for each I/O request of the plurality of I/O requests, the storage device handles the I/O request by:
- removing the I/O request from the submission queue,
- processing the I/O request, and
- inserting the I/O request into the completion queue as a completed I/O request.

19. The computing device of claim 18, wherein the at least one processor further causes the computing device to, for each completed I/O request:
- inform a calling entity associated with the completed I/O request; and
- transmit, to the storage device, an acknowledgement associated with the completed I/O request.

20. The computing device of claim 15, wherein the submission queue stores I/O requests are that have yet to be processed by the storage device.

\* \* \* \* \*

UNITED STATES PATENT AND TRADEMARK OFFICE
CERTIFICATE OF CORRECTION

| | | |
|---|---|---|
| PATENT NO. | : 11,144,481 B2 | Page 1 of 1 |
| APPLICATION NO. | : 16/136161 | |
| DATED | : October 12, 2021 | |
| INVENTOR(S) | : Bhaskar R. Adavi et al. | |

It is certified that error appears in the above-identified patent and that said Letters Patent is hereby corrected as shown below:

In the Claims

In Claim 20, at Column 15, Line 23: "submission queue stores I/O requests are that have yet to be" should read -- submission queue stores I/O requests that have yet to be --.

Signed and Sealed this
Seventh Day of June, 2022

Katherine Kelly Vidal
*Director of the United States Patent and Trademark Office*